May 11, 1943.　　　　N. G. HOVLID　　　　2,318,779
TIRE REPAIRING APPARATUS
Filed May 8, 1940　　　2 Sheets-Sheet 1

INVENTOR.
NORMAN G. HOVLID
BY
ATTORNEY.

May 11, 1943.　　　　N. G. HOVLID　　　　2,318,779
TIRE REPAIRING APPARATUS
Filed May 8, 1940　　　2 Sheets-Sheet 2
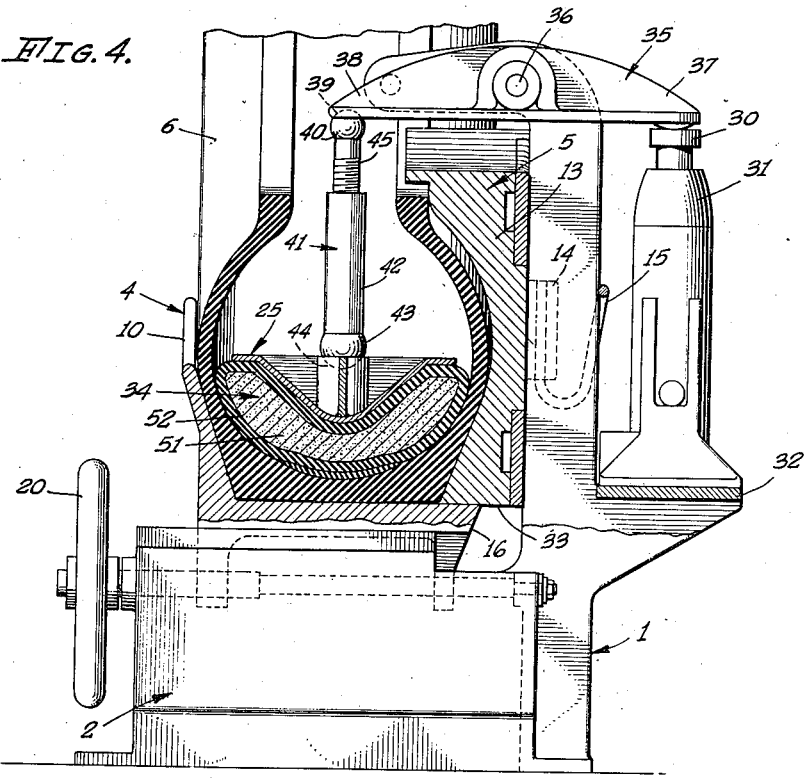
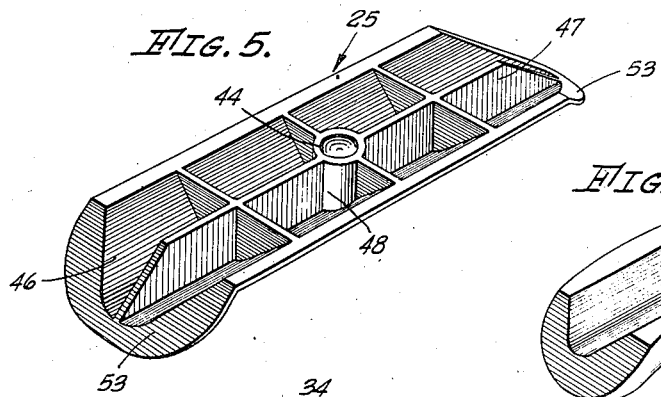
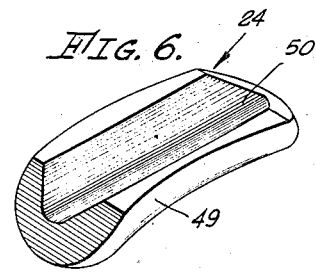
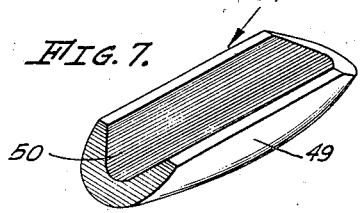
INVENTOR.
NORMAN G. HOVLID
BY
ATTORNEY.

Patented May 11, 1943

2,318,779

UNITED STATES PATENT OFFICE 2,318,779

TIRE REPAIRING APPARATUS

Norman G. Hovlid, Torrance, Calif.

Application May 8, 1940, Serial No. 333,975

8 Claims. (Cl. 18—18)

My invention relates to a tire repairing apparatus and has particular reference to a section vulcanizer particularly adapted for local vulcanizing operations on pneumatic tires.

Pneumatic tires, such as are employed on automobiles and trucks, are occasionally rendered useless before they are actually worn out because of an accident resulting in a "break" in the tire casing. Such injury usually results from the tire being brought into violent contact with angular obstructions, such as curbs, highway markers, and the like. The force of such an impact breaks the cords or fabric making up the inner layers of the casing and sometimes breaks the cords in all of the layers. Unless repaired the resulting break will pinch and chafe the inner tube sufficiently to cause it to leak and also so weaken the tire carcass as to create an imminent danger of a blowout. Repairs of such breaks are made by first removing a part of the cords or fabric around the break and then vulcanizing into the space thus provided a patch made of new rubberized cord or fabric material to reinforce the casing at the break and to provide a smooth inner surface to be engaged by the inner tube.

Prior to my invention this vulcanizing operation was performed in sectional vulcanizers employing molds or supporting members having an arcuate cavity of semi-circular cross section into which the tire was placed. Pressure was applied to the patch by means of a clamp or press adapted to provide a force directed downwardly and perpendicular to the tread surface of the tire, a pressure pad (usually a sand bag) being inserted between the press or clamp and the patch.

Because of the relatively short arcuate length of the cavity, these vulcanizers were capable of repairing a small number of different diameter tires, but because of the semi-circular cross sectional shape of the cavity could be employed for repairing only one or two different widths of tires. Thus a tire repair shop had to be equipped with a relatively large number of such vulcanizers in order to permit the making of repairs to the great variety of sizes of tires encountered.

Furthermore, these vulcanizers were unsuited for making repairs to the side walls of the tires for the reason that the forces developed by the clamp or press were directed parallel to the side walls and not normal thereto as is required in order to press the patch into intimate contact with the tire side wall. Attempts to effect such side wall repairs depended upon the flowing and distortion of the pressure pad or sand bag to convert the downward pressure of the clamp into a sidewards pressure against the side wall, such attempts being unsuccessful for the reason that the sand bags would not distribute the pressure.

The sand bags were in fact somewhat unsatisfactory under any conditions for the reason that uniform pressure, such as is desired, could not be obtained by the sand bags. Other materials employed as pressure pads in an attempt to realize uniform pressure on the patch were not satisfactory for various reasons, such as the inability to withstand the vulcanizing temperature, the tendency to flow and become permanently distorted when subjected to pressure for any length of time and the lack of ability to conform to the variously shaped interior tire surfaces with which they were used.

It is accordingly an object of my invention to provide an apparatus for making sectional repairs to pneumatic tires on either the side wall or tread portions thereof.

It is also an object of my invention to provide an apparatus of the character set forth in the preceding paragraph which is adjustable so as to accommodate various sizes of tires.

It is an additional object of my onvention to provide an apparatus of the character set forth in the preceding paragraphs which is adjustable in one direction to accommodate tires of various tread widths and independently adjustable in another direction to accommodate tires of various side wall heights.

It is another object of my invention to provide a pressure pad for use with the above described apparatus which is capable of readily conforming to the various shapes of interior surfaces found in pneumatic tires of different makes and sizes.

It is also an object of my invention to provide a pressure pad of the character set forth in the preceding paragraph which includes a body portion of semi-plastic material which is at the same time partially plastic and partially resilient enclosed by an outer layer of resilient material.

It is an additional object of my invention to provide a pressure pad of the character set forth in the preceding paragraphs which comprises a body portion of uncured rubber enclosed by an integral outer layer of completely cured and vulcanized rubber.

Other objects and advantages of my invention will be apparent from a study of the following specifications, read in connection with the accompanying drawings, wherein:

Fig. 4 is a cross sectional view similar to Fig. 3 but illustrating the manner in which the apparatus of my invention is employed for effecting a repair to the tread portion of a tire casing;

Fig. 5 is a perspective view illustrating one form of pressure plate adapted for use with pressure pads of various types;

Fig. 6 is a perspective view illustrating a type of pressure pad which may be employed for making side wall repairs; and Fig. 7 is a perspective view similar to Fig. 6 but illustrating a type of pressure pad to be employed in effecting repairs to the tread portion of a tire carcass.

Figure 1:
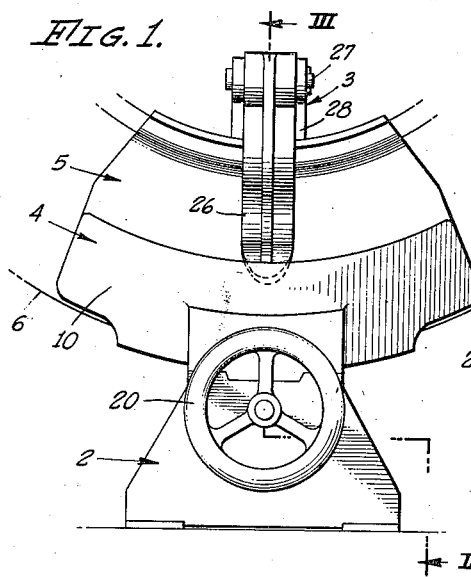
Fig. 1 is a front elevational view of one form of tire repairing apparatus of my invention.
Figure 2:
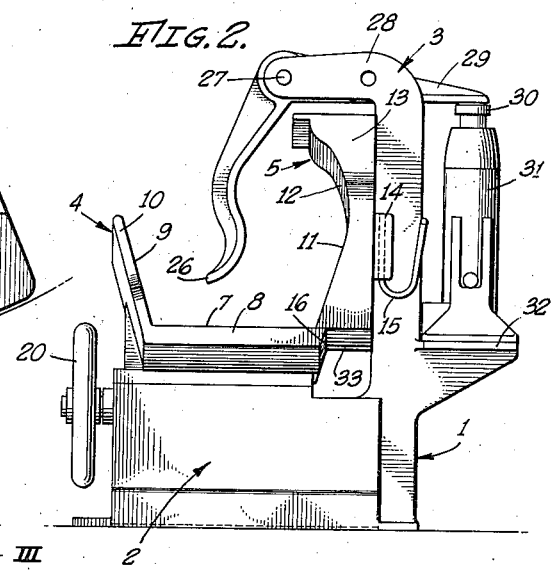
Fig. 2 is an end elevational view of the apparatus illustrated in Fig. 1.

Referring to the drawings, I have illustrated the preferred embodiment of my invention as including a supporting structure 1 which comprises a base portion 2 and an upright portion 3 extended upwardly from one side of the base 2. The base portion 2 and the upright 3 cooperate to carry a pair of supporting plates 4 and 5, the supporting plate 4 being carried by the base portion 2 while the supporting plate 5 is mounted on the upright 3. As is clearly shown in Figs. 1 and 3, the supporting plate 4 is adapted to receive and engage the tread portion and one shoulder portion of a tire 6 which may be placed within the device, the tread engagement being effected by means of a tread engaging surface 7 formed in a substantially horizontally disposed plate portion 8 of the supporting plate 4, while the shoulder engagement is achieved by means of a shoulder engaging surface 9 formed by an upwardly and outwardly extending flange 10 formed integrally with the plate portion 8.

The other supporting plate 5 is provided with an interior surface which includes a shoulder engaging portion 11 and a side wall and bead engaging portion 12, these surfaces being formed on a generally vertically disposed plate member 13 which is mounted for slidable movement upwardly and downwardly along the supporting column 3. Such a slidable mounting of the supporting plate 5 may be achieved by forming on the rearward face of the plate portion 13 a pair of lugs 14 which extend rearwardly along opposite sides of the upright 3 to act as guiding members and guide the supporting plate 5 in its movement along the upright.

The supporting plate 5 may be held back against the forward face of the upright 3 as by providing a spring 15 which is securely engaged at one end with one of the rearwardly extending lugs 14, extended across the back of the upright 3, and securely engaged at its other end with the opposite one of the lugs 14. It will be observed that the frictional engagement afforded by the spring between the spring and the upright 3 and between the plate portion 13 and the upright 3 will serve to hold the supporting plate 5 in any position in which it may be placed along this upright. The supporting plate 5 may thus accordingly be placed in such position as to adjust the vertical distance between the upper end of the side wall and bead engaging surface 12 and the tread engaging surface 8 of the supporting plate 4 to conform to the corresponding dimensions on the tire 6.

As soon as this adjustment has been made, the supporting plate 4 is moved inwardly toward the support 3 to bring an inner end 16 thereof into engagement with the shoulder engaging surface 11 of the supporting plate 5, such slidable movement of the supporting plate 4 being obtained as by slidably mounting the supporting plate 4 upon the base portion 2 and extending lugs 17 and 18 downwardly from the plate portion 8 of the supporting plate 4 and into engagement with a horizontally extending feed screw 19 which may be journaled for rotation within the base portion 2. Manual rotation of the feed screw 19 may be readily effected as by providing a readily accessible hand wheel 20 upon the forward end thereof.

Figure 3:
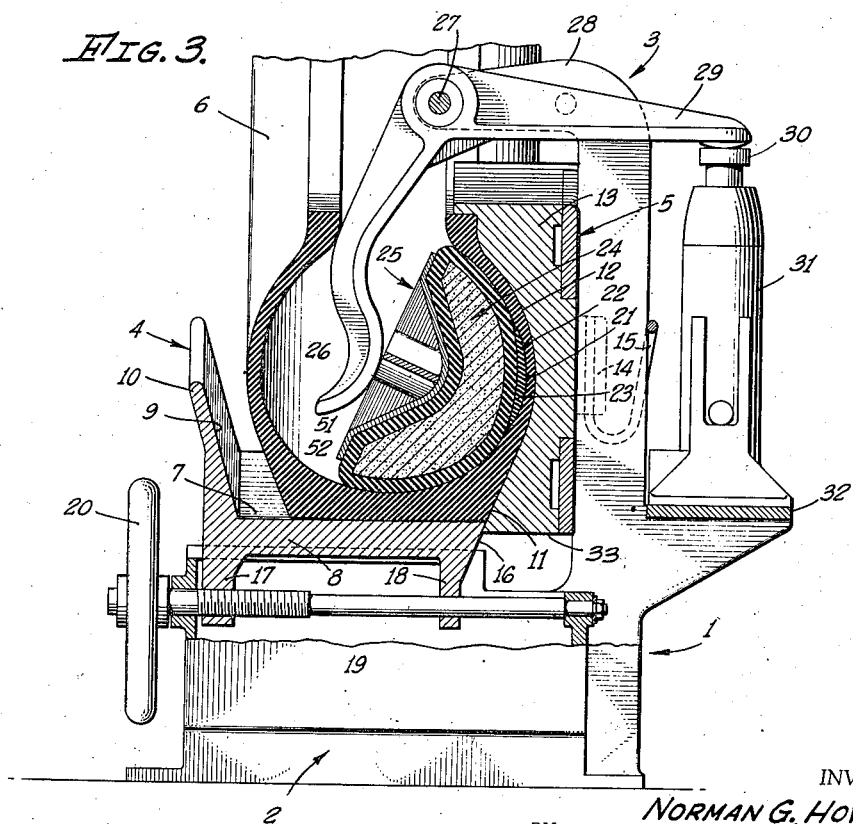
Fig. 3 is a cross sectional view taken substantially along the line III—III of Fig. 1 and illustrating the manner in which the apparatus is employed for effecting a repair to a side wall portion of a tire casing.

The relative disposition of the parts when thus adjusted is illustrated in Fig. 3, this adjustment being particularly designed for the making of repairs to the side wall portions of the tire casing 6. I have illustrated the manner in which a portion of the casing material closely adjacent a break 21 is removed, as indicated at 22, and the manner in which a patch 23 is placed within the space 22. In order to vulcanize this patch securely in place, it is essential that it be forced tightly against the side wall of the tire and for this purpose I employ a novel form of pressure pad 24 which will be described in more detail hereinafter.

The pressure pad 24 may be pushed into firm engagement with the patch 23 as by providing a pressure plate 25 against which bears the lower end of one arm 26 of a bell crank which is pivotally mounted, as indicated at 27, upon forwardly extending arm portions 28 of the upright 3. The upright 3 is preferably bifurcated at its upper end so as to receive the bell crank between the resulting arm portions 28. A rearwardly extending arm 29 of the bell crank is so disposed as to be moved upwardly by a suitable power means as by a ram member 30 of a hydraulic jack 31, which jack may be supported upon the upright 3 as by providing a bracket or shelf 32 thereon.

It will be observed that with the apparatus just described, actuation of the hydraulic jack 31 to move the ram 30 thereof upwardly will result in the downwardly extending bell crank arm 26 being moved in such direction as to force the pressure plate 25 and the pressure pad 24 securely against the patch 23 and clamp that patch against the side wall of the tire casing 6 between the pressure pad 24 and the side wall engaging surface 12 of the supporting plate 5. Heat for effecting the vulcanizing operation may be supplied from the supporting plate 5 as by heating this supporting plate by any suitable means such as by embedding electrical heating elements therein or by providing a steam jacket which is connected thereto in such manner as to readily conduct heat to the supporting plate 5.

The same apparatus may also be used for vulcanizing patches across breaks in the tread and shoulder portions of the tire 6. In order to effect such a repair the parts are disposed in the relative positions which are illustrated in Fig. 4, the supporting plate 5 being elevated sufficiently far to allow the tread engaging supporting plate 4 to be horizontally moved inwardly toward the support 3 so as to bring the flange portion 10 thereof into firm engagement with the outer shoulder of the tire 6. The supporting plate 5 is then lowered along the support 3 to bring a lower end 33 of the supporting plate 5 to rest upon the innermost portion of the tread engaging surface 7. As is clearly shown in Fig. 4 this provides a support for the tread portion of the tire and for the shoulder portions of the tire which are closely adjacent to the tread portions.

In effecting a repair to the tread portion, a patch is placed over the break in the manner illustrated in Fig. 4, a pressure pad 34 and the pressure plate 25 are then placed over the patch and forced downwardly to press the patch tightly against the tread and shoulder portions of the tire 6. Downward pressure may be exerted on the pressure plate 25 by employing a lever 35 which may be pivotally secured to the upright 3 between the forwardly extending arms 28 as by means of a pivot pin 36, the lever 35 including a rearwardly extending arm portion 37 adapted to extend over the ram 30 of the hydraulic jack 31. An opposite end 38 of the lever 35 has a partially spherical depression 39 formed in the lower surface thereof to receive a spherical end 40 formed upon an adjustable link 41 which is extended between the arm 38 and the pressure plate 25. The link 41 preferably comprises a lower portion 42 upon the lower end of which is formed a spherical portion 43 adapted to be received in a correspondingly shaped depression 44 formed in the structure of the pressure plate 25, the upper end of the lower portion 42 being drilled and threaded to receive a threaded upper portion 45. Relative rotation between the upper portion 45 and the lower portion 42 will result in a change in the overall length of the adjustable link 41 so as to permit the mechanism to be adjusted to conform to the various tread thicknesses of tires which may be placed within the device.

It will be observed that with this arrangement, upward movement of the ram 30 will operate to force the pressure plate 25 downwardly and securely force the patch outwardly into engagement with the tread and shoulder portions of the tire 6. The heat required for vulcanizing the patch in place may be derived from the lower supporting plate 4 as by providing suitable heating elements associated therewith.

In making repairs of this type, it is highly desirable that the pressure which is applied to the patch be substantially uniformly distributed thereover so as to insure that sufficient pressure is applied to all parts of the patch to effect a complete and permanent vulcanized bond between the patch and the tire casing. It is accordingly desirable to apply the force which is derived by movement of the end 26 of the bell crank and by movement of the adjustable link 41 as uniformly as possible throughout the upper surface of the pressure pads 24 and 34.

I have illustrated in Fig. 5 one form of pressure plate 25 which is particularly adapted to uniformly apply the pressure to the pressure pads. This form of pressure plate includes a plate portion 46 which is formed as by die stamping or casting into a shape adapted to conform to the configuration of the upper surface employed on the pressure pads 24 and 34. This structure is preferably braced by means of a system of longitudinally and transversely extending webs 47 which are connected to each other and to a centrally disposed boss 48 within which is formed the aforementioned spherical depression 44. The longitudinally extending and transversely extending braces 47 operate to make the tire pressure plate structure into an inherently rigid unit so that pressure which is applied to the boss 48 will be uniformly transmitted to all portions of the upper surface of the pressure pads 24 and 34 which are engaged by the plate portion 46 of the pressure plate 25.

While I have described the use of the one pressure plate 25 with both of the pads 24 and 34, it will be understood that separate pressure plates, each particularly adapted for use with one of the pads, may be used if desired. Furthermore, the pressure plates may be permanently secured to the pressure pads if desired.

I have illustrated in Figs. 3 and 6 the preferred form of construction of the pressure pad 24 and in Figs. 4 and 7 the preferred construction of the pressure pad 34. These pressure pads differ from each other in that they are curved about different axes, the pad 24 being curved about an axis extending transversely of the upper surface of the pressure pad, while the pad 34 is curved about an axis extending parallel to the corresponding upper surface, thus placing the pressure pad 24 in a form substantially conforming to the curvature of the side walls of the tire 6 while placing the pressure pad 34 in a form substantially conforming to the curve of the tread portion of the tire 6.

As is illustrated in Figs. 6 and 7, each of these pressure pads is so formed as to provide a lower or tire engaging surface 49 which is so shaped as to substantially conform to that portion of the tire with which it is designed for use. The upper surfaces of these pads are so formed as to define a longitudinally extending groove 50 of such configuration as to provide a substantially uniform amount of pressure pad material between the pressure plate 25 and the tire casing 6 at all points. This groove and the remainder of the upper surface of the pressure pads is made to conform closely to the configuration of the plate portion 46 of the pressure plate 25 intended to be used therewith.

As is illustrated in Figs. 3 and 4, each of the pressure pads 24 and 34 is formed with a body portion 51 of semi-plastic material which is surrounded by an outer layer 52 of resilient material. By semi-plastic material, I mean material which is to a certain extent resilient but which is also plastic to the extent that it will flow under reasonable pressures and be more or less permanently deformed thereby. I have found that devulcanized rubber, such as is known in the rubber business as "reclaim" to be particularly suitable for this body portion 51.

The outer layer 52 may likewise be formed of rubber which is completely cured and vulcanized so as to exhibit the usual resilient characteristics of vulcanized rubber. By forming the pressure pads of rubber in this fashion, the outer layer 52 may be formed integrally with the body portion 51 so as to at all times insure conformity between the configuration of the outer layer 52 and the outer surface of the body portion 51. I have found that the pressure pad comprising a semiplastic body portion surrounded and enclosed by a resilient outer layer can be temporarily distorted by the application of moderate pressures so as to exactly conform to the interior surface of the tire against which it is pressed.

The fact that the body portion 51 flows under pressure permits the entire pad to so conform and after being thus molded into a conforming shape operate to transmit pressure from the pressure plate 25 uniformly throughout the entire area with which it is engaged. The outer layer 52 of resilient material coacts with the semi-plastic body portion to prevent this material from flowing more than is necessary in order to obtain the necessary conformity, thus insuring the maintenance of the desired pressure upon the inside of the tire casing. In this connection it will be observed that the pressure plate 25 has its plate portion 46 so formed as to provide flange portions 53 adapted to cover the greater part of the external surface of the pressure pad which is not actually placed in contact with the interior surface of the tire casing so as to thus further inhibit flowing of the semi-plastic material any more than is required in order to bring the pad into conformity with the surface against which it is forced.

I have also found that if the cross sectional and longitudinal curvatures of the pressure pads 24 and 34 are formed with a somewhat shorter radius than the corresponding curvatures of the tire with which the pad is to be used, as the pad is forced into engagement with the inner surface of the tire pressure contact will be achieved first between a central portion of the pad, this pressure contact progressively extending outwardly from the central portion to the extreme edges thereof as pressure is increased upon the pressure plate 25. This action tends to provide a rolling action to smooth the patch into place and to force out from between the patch and the tire casing any air that might be trapped therebetween and tend to inhibit the making of a satisfactory repair.

Attention is called to the fact that by forming the supporting plates 4 and 5 with tire engaging surfaces of such shape as to substantially conform to the average size of tire with which the supporting plate is designed to be used, the relatively small arcuate span of these mold sections permits them to be satisfactorily used with tires of different sizes since a relatively small distortion of the tire will bring it into the proper engagement with the relatively small mold surface. The pressure serves only temporarily to modify the tire contour, without causing the repaired spot to retain any permanent set.

While I have illustrated and described the operation of my sectional vulcanizer in connection with the making of repairs to the tread and side wall portions of a tire, it will be readily understood that the apparatus may also be used for effecting repairs to breaks occurring at locations other than those illustrated herein. I have found that each of the lever mechanisms described can be satisfactorily employed when the pressure plate and pressure pad are placed in intermediate angular positions as when repairing the shoulder portion. This is permitted by the universal type of connection which is afforded between the levers and the pressure plate and by the pressure equalizing characteristics of the pressure pad which I employ. This universal connection includes the curved configuration of the pressure applying end of arm 26. Since this curved end contacts the plate 25 at substantially the center portion of the tire section, it is possible to adjust the pad position while still maintaining the proper pressure applying position of the lever arm 26. In this way, the pad 24 may be made to apply pressure over a limited selected area on the interior of the tire 6, such that the arc corresponding to the cross section of the area of contact is substantially less in extent than the complete interior arc of the tire section. Furthermore, repairs to the shoulder portion may be effected by use of the thread pad 34 which is so constructed as to bear simultaneously against the tread and the shoulder, and the pad 34 may also be used for large repairs extending completely across the tread and up the shoulders. The above described apparatus is accordingly capable of performing sectional vulcanized repairs of greater size than has been hitherto possible, and is also capable of making such repairs to a tire casing irrespective of the location of the injury to be repaired.

From the foregoing it will be observed that I have provided a tire repairing apparatus which is particularly adapted for the making of sectional repairs in pneumatic tires and which is so constructed as to permit the repairing of breaks occurring in either the side wall or the tread portions of the tire.

It will also be observed that the apparatus of my invention is adjustable in size so as to permit the repairing of various sizes of tires, the adjustment of the tread width and the adjustment of the side wall height being substantially independent of each other so that the mold may be adjusted to fit the particular size of tire to be repaired irrespective of whether the repair is to be made upon the tread portion or the side wall portion of the tire.

It will also be observed that I have provided a pressure plate and pad construction of such type that uniform application of vulcanizing pressure to the patch to be vulcanized is readily achieved.

While I have shown and described the preferred embodiment of my invention, I do not desire to be limited to any of the details of construction shown or described herein, except as defined in the appended claims.

I claim:

1. In a tire repairing apparatus, the combination of: a support; an arcuate tire supporting plate carried by said support and having a tire engaging surface substantially conforming to a segmental portion of the exterior surface of the side wall of a tire to be repaired; another arcuate tire supporting plate also carried by said support and having a tire engaging surface substantially conforming to a segmental portion of the exterior surface of the tread of a tire to be repaired, said supporting plates being disposed in such relative positions as to extend said tire engaging surfaces transversely of each other to define a space for receiving said tire; means adjustably mounting each of said supporting plates on said support for independent adjustment in planes substantially parallel to the tire engaging surfaces of said plates toward and away from each other to vary the configuration of said tire receiving space and accommodate tires of different side wall heights and tread widths; and means on said support for exerting the pressure upon the inside of said tire for pressing said tire against at least one of said supporting plates.

2. In a tire repairing apparatus, the combination of: a support; a side wall supporting plate carried by said support in a position to engage the exterior side wall of a tire; an L-shaped bell crank pivotally connected to said support in a position extending one arm of said crank laterally and the other arm downwardly to dispose the lower end thereof in a position adjacent the interior surface of that portion of the side wall of said tire which is engaged by said supporting plate; a pressure pad interposed between said lower end of said crank and said tire; and hydraulic means carried by said support in a position to apply an upwardly directed force to said horizontally extending arm for applying an outwardly directed pressure to said pad to thereby apply pressure to a patch placed anywhere between said pad and said side wall.

3. In a tire repairing apparatus, the combination of: a support; a tread supporting plate carried by said support in a position to engage the tread portion of a tire; a lever pivoted to said support, one arm of said lever extending rearwardly away from said tire and the other arm forwardly over said tread portion; a pressure pad in contact with the interior surface of said tread portion; an adjustable length link extended between the end of said forwardly extending arm and said pressure pad; and hydraulic means carried by said support in a position to apply an upwardly directed force to said rearwardly extending arm for applying a downwardly directed pressure to said pad to thereby apply pressure to a patch placed anywhere between said pad and said tire.

4. In a tire repairing apparatus, the combination of: a support; a tire supporting plate carried by said support and including means for simultaneously engaging a portion of the side wall and tread of a tire to support said tire; a hydraulic means for producing an upwardly directed force; and a bearing construction on said support for removably securing to said support either of two movable means, one so constructed and arranged as to translate said upwardly directed force into a laterally directed force against the interior surface of that portion of the side wall of the tire which is engaged by said supporting plate to thereby apply pressure to a patch placed on said interior surface, and the other being so constructed and arranged as to translate said upwardly directed force into a downwardly directed force against the interior surface of that portion of the tread of the tire which is engaged by said supporting plate to thereby apply pressure to a patch placed on said interior surface.

5. In a tire repair apparatus, means forming curved surfaces adapted to contact a limited portion of the exterior curved surface of a tire, a pressure transmitting pad adapted to be positioned within the tire and conformable, upon application of pressure thereto, to a portion of the interior surface of the tire, and adjustable to select a portion of the interior arcuate area of the tire cross section to be subjected to the pad pressure, and means, extending into the tire for exerting a pressure upon the pad in any of the adjusted positions of the pad, comprising a pivoted lever having an arm provided with a curved pressure exerting end.

6. In a tire repair apparatus, means forming curved surfaces adapted to contact a limited portion of the exterior curved surface of a tire, a pressure transmitting pad adapted to be positioned within the tire and conformable, upon application of pressure thereto, to a portion of the interior surface of the tire, and adjustable to select a portion of the interior arcuate area of the tire cross section to be subjected to the pad pressure, and means, extending into the tire for exerting a pressure upon the pad in any of the adjusted positions of the pad, comprising a pivoted lever having an arm with a curved pressure exerting end, and a pressure plate between said pad and said end.

7. In a tire repair apparatus, means forming curved surfaces adapted to contact a limited portion of the exterior curved surface of a tire, a pressure transmitting pad adapted to be positioned within the tire and conformable, upon application of pressure thereto, to a portion of the interior surface of the tire, and adjustable to select a portion of the interior arcuate area of the tire cross section to be subjected to the pad pressure, and means, extending into the tire for exerting a pressure upon the pad in any of the adjusted positions of the pad, comprising a pivoted lever having an arm with a curved pressure exerting end, a pressure plate between said pad and said end, and hydraulic means for operating said lever.

8. In a tire repair apparatus, a tire tread engaging member, said member having an end surface as well as a surface for contacting the exterior tread portion of the tire, a tire shoulder engaging member having a pair of surfaces adapted optionally to contact respectively with the end surface, and with the tire tread contacting surface, and means for independently adjusting the positions of each of said members.

NORMAN G. HOVLID.